United States Patent [19]

Eissfeller

[11] Patent Number: 5,743,705
[45] Date of Patent: Apr. 28, 1998

[54] INDUSTRIAL ROBOT

[76] Inventor: Roman Eissfeller, Breslauer Strasse 13, D-78194 Immendingen, Germany

[21] Appl. No.: 527,624

[22] Filed: Sep. 13, 1995

[30] Foreign Application Priority Data

Sep. 13, 1994 [DE] Germany .................. 9414820 U

[51] Int. Cl.$^6$ .................................................. B25J 9/02
[52] U.S. Cl. ................................... 414/749; 901/16
[58] Field of Search ............................. 414/749–753; 901/4, 16

[56] References Cited

U.S. PATENT DOCUMENTS

| | | | |
|---|---|---|---|
| 3,665,148 | 5/1972 | Yasenchak | 219/125 |
| 3,830,382 | 8/1974 | Nagamori | 214/1 BB |
| 4,132,938 | 1/1979 | Sano et al. | 901/4 |
| 4,311,556 | 1/1982 | Iwamoto | 376/249 |
| 4,571,149 | 2/1986 | Soroka et al. | 901/16 |
| 4,637,761 | 1/1987 | Murray | 408/16 |

FOREIGN PATENT DOCUMENTS

| | | | |
|---|---|---|---|
| 2070719 | 9/1971 | France | B66B 9/00 |
| 2682909 | 4/1993 | France | B25J 9/07 |
| 2225476 | 12/1973 | Germany | G05G 21/00 |
| 603577 | 4/1978 | U.S.S.R. | 901/16 |
| 1511609 | 5/1978 | United Kingdom | B25J 17/00 |

*Primary Examiner*—Donald W. Underwood
*Attorney, Agent, or Firm*—Stein, Pendorf & Van Der Wall

[57] ABSTRACT

The industrial robot exhibits a moveable work arm for manipulation of work pieces and a mechanism for movement of the work arm. The mechanism is provided with three linear movement devices (1, 10, 20), via which the work arm (30) is moveable in three directions orthogonal to each other. The industrial robot is ideally constructed of lightweight materials with known steel and/or aluminum sheets.

1 Claim, 3 Drawing Sheets

INDUSTRIAL ROBOT

BACKGROUND OF THE INVENTION

1. Field of the Invention

The present invention concerns an industrial robot comprising a moveable work arm for manipulation of work pieces and a mechanism for movement of the work arm.

2. Description of the Related Art

The invention concerns an industrial robot with the characteristics according to the preamble of claim 1.

Such an industrial robot is known for example from the brochure Brockhans, Physical Science and Technology, Second Edition, 1989, page 306. Herein industrial robots are described as being universally employable automated devices for manipulation of work pieces or tools. The industrial robot is provided for this purpose with a movable work arm for the manipulation of the work piece or, as the case may be, the tool, and with a mechanism which can manipulate the work arm. The mechanism is driven three dimensionally by a drive device, and a control device for the drive device is provided as well as a measuring arrangement for the determination of the position of the work arm.

Industrial robots are ideally suited in the industrial processes to automate the manipulation of work pieces such as, for example, the unloading and loading of work machines, and manipulation of tools such as, for example, spot welders, soldering welders, painting guns and the like.

The industrial robots which have been known to date are characterized however by the disadvantages such as comparatively heavy mechanisms and complicated means for control of the movement mechanism, which requires a complex programming of the movement control even in the carrying out of a simplified manipulation such as painting or welding. The hitherto known industrial robots are provided with a number of rotating axis which are connected to each other, which must be coordinated to each other even in a simple linear movement of the work arm.

The heavy mechanism of such industrial robots on the one hand and the high program complexity for controlling the movement of the work arm on the other hand result in a comparatively high cost for the industrial robot, so that their employment has only been economically justifiable for highly productive work processes.

The present invention is concerned with the object of providing an industrial robot which in comparison to the until now known industrial robots is substantially simpler in construction and which is simpler to program.

SUMMARY OF THE INVENTION

The invention is thus concerned essentially therewith, that the mechanism for movement of the work arm of the industrial robot exhibits at least three linear movement devices. By means of a first linear movement device, the work arm is moved in the X-direction, by means a second linear movement device in the Y-direction and by means of third linear movement device in the Z-direction linear, whereby the X-,Y- and Z-directions are aligned orthogonally to each other.

By the provision of three such linear movement devices is the simplest way possible to move a work arm to a pre-desired position. The linear movement devices can hereby be moved, each according to the point to be reached, and completely independently of each other in their movement direction. If for example the work arm must be moved substantially sideways in the X-direction, it is according to the invention only necessary that the first linear movement device is operated. In the hitherto known industrial robots with three axis it has in comparison been necessary that all three rotating axis are moved in dependence upon each other in order to produce a sidewards movement of the work arm in the X-direction.

In the further development of the invention the industrial robot is provided with at least a further movement device for turning or rotating of the work arm.

The first and second linear movement devices are comprised preferably of a guiderail, upon which a holding device is displaceable in the X-direction or as the case may be the Y-direction. It is preferred that these two linear movement devices are driven by a endless toothed belt. In larger devices a spindle drive could also be provided.

The third linear movement device for adjusting the height of the work arm in the longer position is preferably comprised of a scissor lift device. In the simplest case this can be a scissor lift device with single scissor movement arms. For the manipulation of greater loads it has, however, been found desireable to use two sets of scissor movement arms next to each other and to provide on their upper side a work platform. At least one of the scissor movement arms, preferably all scissor movement arms of the provided scissor lift devices, are on their bottom end connected to a drive device, with which a scissor movement arm can be moved in the Z-direction and therewith the height of the work platform found upon the scissor lift device can be varied.

During use of a scissor lift device it has been found useful to connect at the bottom end of each of the scissor shanks a spring device for adjusting the load. Beyond this a further spring assembly can be provided for final load balancing.

According to the invention there is coupled to each movement or, as the case may be, linear movement device of the industrial robot a sensor device, for example an encoder. This together with the control device coupled sensor device serves for determining the movement of each movement or, as the case may be, linear movement device and therewith also the position determination of the work arm.

In a further development of the invention each movement or, as the case may be, linear movement device, is connected with a drive device by means of a coupling device. Dependent upon the operation of a switch device the movement or, as the case may be, linear movement devices are individually or collectively couplable or uncouplable from the corresponding drive device.

In the uncoupled state the collective linear movement devices are, in accordance with the present invention, in a state of equilibrium, that is, they can be moved by hand without great expenditure of energy. This is taken advantage of together with the provided sensor devices for programming of the control assembly.

If the collective drive devices are uncoupled from the corresponding movement or, as the case may be, linear movement devices, then the work arm or, as the case may be, the work arm with the work load then secured to it can manually be moved without great expenditure of energy. This movement is, in accordance with the invention, detected by sensor devices and the control device is informed thereof via suitable data lines. By the manual movement of the work arm or, as the case may be, work head the steering control device can in a simply way be instructed of work process which can subsequently be run automatically. After the ending of such a programming input, the movement or, as the case may be, linear movement device is again coupled with the drive device. This can occur, for example, by means of the operation of a switch device, for example, a switch. Thereafter the program can be started. After the program starts the work arm or as the case may be the work head runs by itself and is steered by means of the controlling device over the movement path which was previously demonstrated manually. The consequence is a very simple programming of the industrial robot according to the invention.

In order to make possible a simple as possible construction of the industrial robot, the industrial robot is constructed of light-weight materials, in particular of known steel and/or aluminum sheet metals.

In the case that it is necessary, the entire industrial robot can additionally be provided upon a rotating disk. This makes it possible that the industrial robot can rotate about its own axis. The rotating disk can be driven by a means of a suitable motor, for example, a step, DC current or alternating current motor, pneumatic coupling and a chain driven means. The pivot range is preferably approximately 360°.

BRIEF DESCRIPTION OF THE DRAWINGS

The invention and further advantages are discussed below in connection with two figures. They are shown.

DETAILED DESCRIPTION OF THE INVENTION

Figure 1:
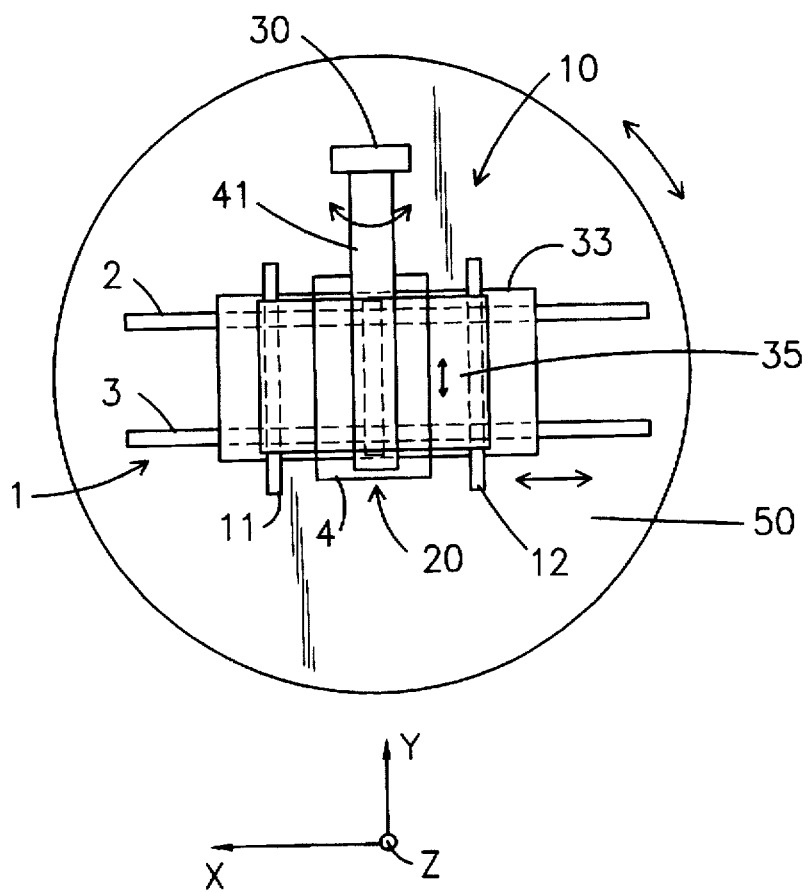
FIG. 1 a top view of a example of an inventive industrial robot.

FIG. 1 shows a top view of an illustrative embodiment of an industrial robot according to the invention. The industrial robot is provided with a rotating disk 50, upon which a mechanism for movement of a work arm 30 is seated. The mechanism takes advantage of three linear movement devices 1, 10, 20, whereby the first linear movement device 1 moves the work arm 30 linearly in the X-direction, the second linear movement device 10 moves the work arm 30 linearly in the Y-direction and the third linear movement device 20 moves the work arm 30 linearly in the Z-direction. The X-, Y-, and Z-directions are oriented orthogonally to each other and define a coordinate cross as shown in FIG. 1. The X-direction extends in the representation according to FIG. 1 in the drawing plane from left to right, the X-direction in the drawing plane from top to bottom and the Z-direction from the drawing plane outwards in the direction of the viewer.

Figure 2:
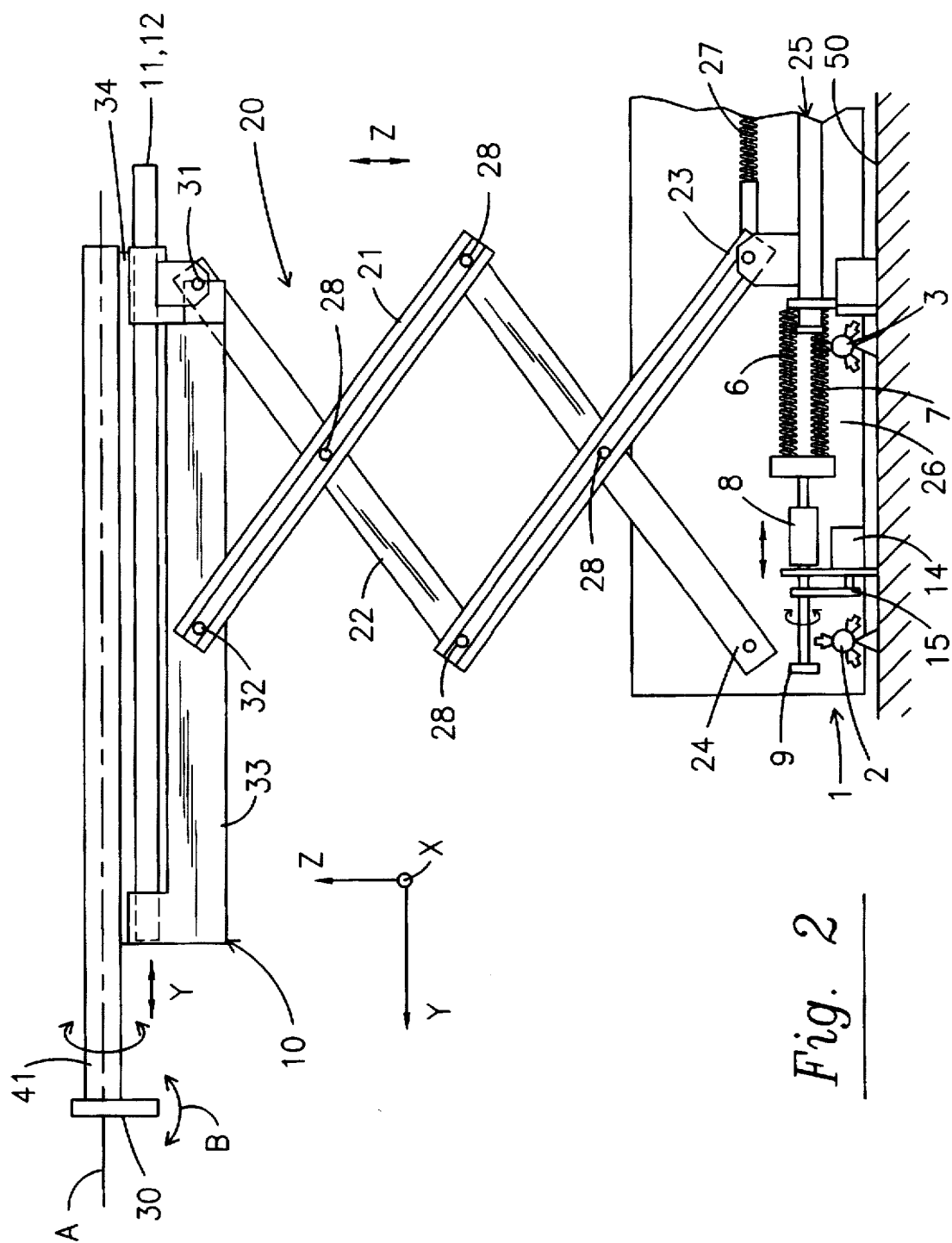
FIG. 2 a side view of the industrial robot as shown in FIG. 1.

Besides the three linear movement devices 1, 10, and 20 the industrial robot in FIG. 1 is provided, for reasons of better ability to monitor, with not shown drive devices for movement of the linear movement devices, via a control device for the respective drive devices as well via a sensing device for determination of the position of the work arm The construction of the industrial robot shown in top view according to FIG. 1 is apparent when viewed in connection with the side view shown in FIG. 2.

Upon the base plate, which may be the above-mentioned rotating disk 50, there are provided two guide rails 2, 3 parallel to each other and extending in the X-direction. Upon these guide rails 3 there is seated, displaceable in the X-direction, a mounting unit 4, for example, a platform. This mounting unit 4 is seated preferably supported on ball bearings upon the two guide rails 3. The driving of the mounting unit 4 upon these two guide rails 2, 3 is accomplished preferably by means of a step motor, but can however also be a hand crank drive. With larger devices there can also be employed a direct current or alternating current motor. The linear movement upon the guide rails 2, 3 along the X-axis is accomplished however preferably by means of a tooth belt drive. As a guide-way there can, for example, be constructed a segment of approximately two meters. For longer guide-ways a spindle or a toothed rod may also be employed in a known manner. According to the invention the above described linear movement device 1 in the X-direction is decouplable from the respective drive device. For this there is provided a not shown pneumatic coupling, which releases the toothed belt, the spindle or the toothed rod from the motor and from the drive. The axle body, upon which the guide rails 2, 3 are situated, is comprised preferably of bent steel and/or aluminum sheets. Upon the mounting unit 4 of the first linear movement device 1 there is a second linear movement device for movement of the work arm 30 in the Y-direction and a third linear movement device 20 for the movement of the work arm 30 in the Z-direction and therewith for the adjustment of the height. A third linear movement device 20 is in the illustrative embodiment shown in FIGS. 1 and 2 constructed as a scissor lifting device. The scissors lifting device 20 is comprised of two scissors movement arms 21, 22, which are connected to each other by linkage means 28. In the illustrative example according to FIG. 2, four such linkage means 28 are provided. The lower ends 23, 24 of the scissors movement arms 21, 22 are coupled with a drive device in order that the scissor angle and therewith the platform 33 situated at the upper ends 31, 32 of the scissors movement arms 22 is adjustable in its height. The drive device 25 pushes the lower ends 23, 24 of the scissors lift device 20 in the Y-direction.

Although, in principal, a one scissor lift device and therewith a Single scissor is sufficient in order to adjust the height of the platform 33, it has been found advantageous, particularly with work arms for carrying heavy loads, to use two or more scissor levers parallel to each other. Thereby the mechanical stability of the industrial robot is increased.

Upon the platform 33 there is seated the already discussed second linear movement device 10, in order that the work arm 30 is capable of being moved linearly in the Y-direction. In the simplest case, this second linear movement device is comprised again of two adjacent parallel running guide rails 11, 12, which are oriented in the Y-direction. These guide rails 11, 12 are seated upon the platform 33, which is connected at the upper ends 31, 32 of the scissor lift device 20. On the two guide rails 11, 12 there is seated a further mounting device 34, preferably mounted on roller bearings, guided in the Y-direction. On this further mounting unit 34 there is seated in the illustrative example according to FIG. 1 and 2 a tube 41, on which front end the work arm 30 is mounted.

It is to be noted, that the third linear device 20 and therewith the scissor lift device is likewise capable of being constructed of angled and reinforced sheets of metal. The third linear movement device 20 is preferably mounted using roller bearings on the guide rails 2 and 3. The drive can be accomplished by means of a step, alternating current or direct current motor and associated drive unit. The adjustment of the height is accomplished by the third linear movement device 20 preferably by a chain drive with little devices, and by means of a spindle with larger devices. The decoupling of motor and transmission is accomplished preferably via a pneumatic coupling, by means of which the appropriate tooth belt or the spindle can be released. The power for lifting is accomplished by means of the spring power combined with an adjustable pneumatic means, which is explained in greater detail below.

With the until now described first, second and third linear movement devices 1, 10, 20 the work arm 30 is moveable in the X-, Y- and Z-directions linearly, and this through the movements of the three linear movement devices 1, 10 and 20 completely independently from each other. A simplified drive device for each of the three linear movement devices 1, 10 and 20 and accordingly a simplified programmability is therewith made possible.

In order to make it possible that the work arm 30, and the thereon situated, and for purposes for simplification not represented, work head is made to pivot or rotate in a desired manner, the tube 41 is preferably rotatable about plus or minus 100° about its axis. The tube is preferably supported on roller bearings in a known sheet metal housing. The drive for rotation for the tube 41 is accomplished preferably by means of a toothed belt and, in the case of small devices, without coupling. With larger devices it is also in cases preferable to provide a pneumatic coupling. As the drive there may be suitably employed a stepper, alternating current or direct current motor. An equalization of power occurs adjustably by means of spring pressure in connection with the pneumatic cylinder.

By means of the provided rotatably supported tube 41 there is accordingly a rotating of the work arm 30 about the axis of the tube 41 made possible.

The work arm 30 is, however, also pivotable or as the case may be rotatable orthogonal to this rotating axis. The work arm 30 with its work head is for this mounted in a T-drive. Within the tube 41 a drive is so provided, so that the work arm is preferably pivotable about an axis of plus or minus 100° about the axis shown in FIG. 2 and indicated with reference B. The axis of the tube 41 is, in comparison, shown in FIG. 2 with reference numeral A.

The industrial robot is seated upon a base plate, which preferably, however, not necessarily, is rotatable. A rotating disk 50 has been found to be economical. Upon this rotating disk 50 the guide rails 2, 3 of the first linear movement device 1 are provided. The drive of the rotating plate 50 can be accomplished by means of a stepper, alternating current or direct current motor, wherein a pneumatic ball coupling and a drive belt, preferably in the form of a chain, are provided. The range of pivoting of the rotating disk is approximately about 360°.

The industrial robot according to the invention is, with respect to its method of construction, produced using light weight materials. That is, sheets of steel and/or aluminum known to have advantages are preferably used for the construction of the industrial robot. Thereby the industrial robot attains a relatively low weight.

This low weight is particularly advantageous for a light actuation repositioning of the work arm 30. This light actuation for the repositioning of the work arm 30 is also used for the reprogramming of the control unit. In a so called teach-in-process the control device is taught the movement to be carried out by the work arm 30. To do this first all of the movement and linear movement devices 1, 10, 20, 30, 40 are uncoupled from their respective drive devices via a switching unit. As a result of a special spring construction, the work arm 30 exists in a floating or as the case may be swimming condition. In this condition the work arm 30 can be moved with particular ease. The work arm 30 is next moved by hand by an adjusting person according to the movement path to be subsequently carried out automatically. The movements of the movement and linear movement devices 1, 10, 20, 30, 40 are sensed via suitable sensor devices and transmitted to the control device. In the control device, these movements are stored in a data storage unit. Dependent upon these stored data a movement control program is set up within the control device, so that subsequently a completely independent movement is capable of being carried out based upon the previously learned movement. After ending of the program input by manual movement of the work arm 30 (teach-in) the individual movement and linear movement devices 1, 10, 20, 30, 40 are again coupled with the respective drive devices by means of the switch device. Upon start of the program the work arm 30 independently carries out the previously learned movement.

For attainment of a lightly actuateable movement of the work arm 30 it is particularly preferred to use a particular spring mechanism for the third linear device 20 and thus the scissor lifting device, in order to establish on the one hand a rest storage position of the scissor lift device and on the other hand to accomplish a load equalization dependent upon the load carried by the work arm 30.

Although a spring mechanism is provided at both lower ends 24 of the scissor lift device 20, for ease of illustration only the spring device provided at the bottom end 23 of the scissor movement arm 22 is shown in FIG. 2. At the lower end 23 of the scissor movement arm 22 two pull springs 6, 7 are coupled. The pull springs 6, 7 are stretched in the Y-direction. By means of a suitable apparatus, here a cylinder 8 and an adjustment spindle 9, the tension of the pull spring 6, 7 can be adjusted. By means of the pull springs 6, 7 the equalization of the load depending upon the load borne by work arm 30 can be achieved. In order to make possible a pre-adjustment of the spring load, a motor 14 is provided which by means of toothed wheel transmission or gear 15 is in operational association with spindle 9. During operation of the motor 14 a height level adjustment and therewith a pre-adjustment of the spring load on the two pull springs 6, 7 can be undertaken.

For a rest storage position adjustment and therewith for stabilization of the scissor movement arms 21, 22, each of the two scissor movement arms are coupled at their lower and with a further spring device 27. With an almost folded together scissors and therewith low height of the work arm 30, the movement arms 21, 22 press with heavy loads of the work arm 30 with increased strength in the Y-direction. In order to counter this pressure the spring device 27, each of which representing one pressure spring, which likewise is oriented in the Y-direction, is coupled at the lower end of each of the two scissor movement arms 21, 22. In the representation according to FIG. 2, the pressure spring of the spring device 27 is directed from the lower end 23 of the scissor movement arm 22 in the Y-direction toward the right, while the pull springs 6, 7 are stretched in the opposite direction. In the not represented spring device for the scissor movement arm 21, the device of the spring axis is directed exactly oppositely to this.

The essential advantage of the industrial robot according to the invention is achieved by the provision of the three linear movement devices and the floating supporting of the work arm 30 during the uncoupled movement. Beyond this the industrial robot according to the invention is constructed of light weight materials. By these measures it is possible in the most simple way to teach the industrial robot the course of movement to be carried out. A complex programming by means of microcomputer and/or specialized machine language is not required.

Figure 3:
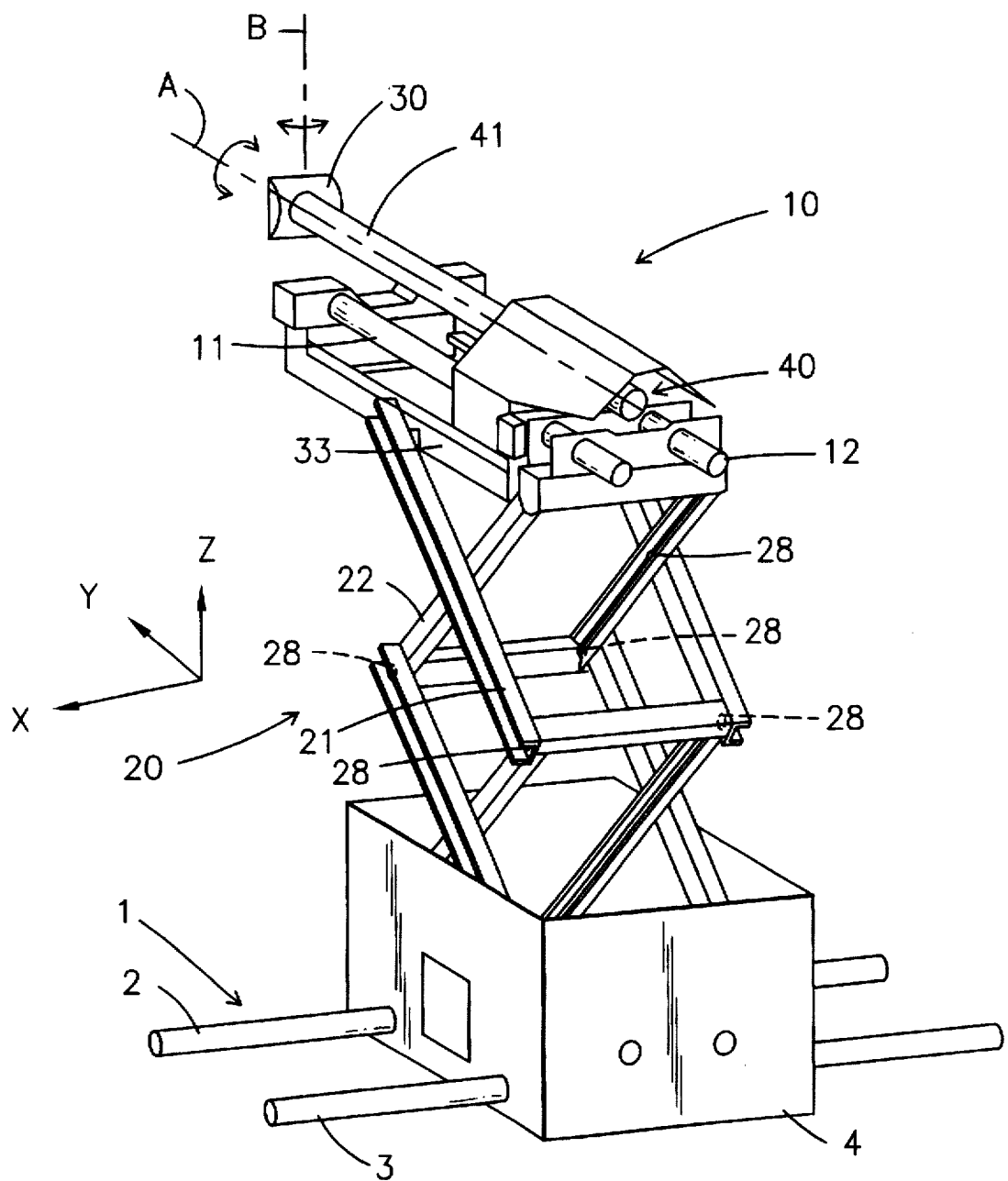
FIG. 3 a schematic exploded view of an industrial robot according to the invention.

In FIG. 3 the industrial robot according to the invention is shown in an exploded representation. The same reference numerals represent the same parts. Clearly to be seen is the double scissor lift device 20, upon which the platform 3 is seated with the two linear movement devices 10.

What is claimed is:

1. An industrial robot comprising:

a moveable arm for manipulation of work pieces;

an arm moving mechanism connected to said arm and comprising at least a first, a second, and a third linear movement device (1, 10, 20) for moving said arm independently in the X-, Y- and Z- directions, said X-, Y- and Z- directions oriented orthogonally to each other;

a drive device connected to each linear movement device (1, 10, 20);

a control device connected to the drive devices for controlling the drive devices; and a sensing device connected to each linear movement device for determining the movement of each linear movement device (1, 10, 20);

wherein said third linear movement device (20) is a scissors lift device comprising a scissors with two scissors movement arms for adjusting the height of the arm (30) in the Z-direction, wherein a spring assembly (26) is attached at the lower end (23, 24) of each of the scissors movement arms (21, 22) for adjustment of the work piece, wherein each of the linear movement devices (1, 10, 20) is connected to its respective drive device via a coupling device, and wherein at least one of the movement devices (1, 10, 20) are coupled and uncoupled from their corresponding drive device by operation of at least one switch device, and wherein a further spring assembly (27) is coupled to lower ends of said scissors movement arms for setting an end position base level for the scissor lift device (20).

* * * * *